United States Patent [19]

Hara et al.

[11] Patent Number: 4,918,138
[45] Date of Patent: Apr. 17, 1990

[54] PROCESS FOR PRODUCING A COLORED MOLDED ARTICLE OF METATHESIS POLYMERIZED POLYMER

[75] Inventors: Shigeyoshi Hara; Zen-ichiro Endo; Umewaka Nakatani, all of Yamaguchi, Japan

[73] Assignee: Hercules Incorporated, Wilmington, Del.

[21] Appl. No.: 310,578

[22] Filed: Feb. 15, 1989

[30] Foreign Application Priority Data

Feb. 15, 1988 [JP] Japan .................... 63-30946
Mar. 17, 1988 [JP] Japan .................... 63-61978
Apr. 26, 1988 [JP] Japan .................... 63-101296
Apr. 26, 1988 [JP] Japan .................... 63-101297

[51] Int. Cl.[4] ............................................. C08K 3/10
[52] U.S. Cl. ................................. 524/785; 526/283
[58] Field of Search ............... 526/101, 103, 107, 169, 526/280, 283, 281; 523/333; 524/783, 785, 847

[56] References Cited

U.S. PATENT DOCUMENTS 4,400,340  8/1983  Klosiewicz .................. 264/328.6
4,598,102  7/1986  Leach ............................. 521/93

Primary Examiner—Joseph L. Schofer
Assistant Examiner—R. H. Delmendo
Attorney, Agent, or Firm—William S. Alexander

[57] ABSTRACT

A process for producing a colored cross-linked molded article by metathesis polymerizing in a mold a mixture comprising metathesis polymerizable monomers such as dicyclopentadiene and a metathesis polymerizable multi-part composition therefor.

8 Claims, No Drawings

PROCESS FOR PRODUCING A COLORED MOLDED ARTICLE OF METATHESIS POLYMERIZED POLYMER

FIELD OF THE INVENTION

This invention reltes to a process for producing a colored molded article and multi-part metathesis polymerizable composition used for producing the modled article.

BACKGROUND OF THE INVENTION

U.S. Pat. No. 4,400,340 and U.S. Pat. No. 4,426,502 disclose the production of a molded article by injecting two kinds of reactive solutions, one of which comprises a norbornene-type monomer such as dicyclopentadiene and the catalyst component of a methathesis polymerization catalyst system and the other comprises a norbornene type monomer and the activator component of the catalyst system under a impingement mixing into a mold in which said liquid mixture is metathesis polymerized in bulk (called "RIM process" hereinafter). RIM process is a low pressure one-step or one-shot injection process and the liquid mixture injected into the mold polymerizes rapidly to form a molded article. Thus, one can easily and cheaply produced large-sized molded articles from norbornene-type monomers such as dicyclopentadiene by RIM process.

The molded articles produced from norbornene-type monomers are, however, usually from light to dark yellow when not colored or not surface-coated. Further, the molded articles produced from norbornene-type monomers have many unsaturated bonds which are susceptible to oxidation and these articles have poor light resistant and anti-oxidant properties. In usual use, therefore, these molded articles must be colored by mixing pigments in the starting composition or coated to provide the molded articles with a beautiful finish and stability.

U.S. Pat. No. 4,598,102 teaches the addition of reinforcing agents or fillers such as glass, wolastonite, mica, carbon black, talc and calcium carbonate into the metathesis polymerizable composition of cyclic olefin monomers. However, U.S. Pat. No. 4,598,102 does not speifcically disclose the kind of carbon black nor does it teach mixing the carbon black specifically with the catalyst component or the activator component of the metathesis polymerization catalyst system.

U.S. Pat. No. 4,080,491 teaches the addition of a coloring agent into a metathesis polymerizable norbornene-type monomers, but does not specifically disclose any kind of coloring agent.

On the other hand, the prior art teaches that the activator component of a metathesis polymerization catalyst system (such as aluminum trialkyls or alkylalumium halides) is more reactive and unstable than the catalyst component of the metathesis polymerizatrion catalyst system (such as tungsten or molybdenum salts). Thus additives such as fillers and pigments have been added in the prior art into the monomer solution containing the catalyst componenet rather than into the monomer solution containing the activator component.

As a result of our stydy of the coloring of the metathesis polymerized molded articles comprising cycloolefin polymer, we have found surprisingly that, among many pigments, particular pigments based on carbon black prepared by an incomplete combustion process, titanium oxides, iron oxides and cobalt oxides can be added to the reactive solutiohns to form reactive solutions which are storable for along period of time without loss of activity. This effect is brought out only when the pigments are dispersed in the reactive solution containing the activator component (Solution B) instead of being dispersed in the solution containing the main catalyst component (Solution A) which is usually understood to be less reactive than the former. Actually, the interaction between the catalyst component and the above-mentioned pigments is not so vigorous, but it is long-lasting. That is, Solution A is gradually deactivated under the presence of the above-mentioned pigments, and when once deactivated, an additional charge of the catalyst component cannot restore the activities enough. On the other hand, the interaction between the activator component and the mentioned pigments, if any, seems to be very rapid, and soon stops. An additional charge of activator to compensate for the consumed portion can bring back the activities of the activator to substantially the initial activity and results in the composition having very stable activities when stored. This is a very unexpected finding and advantageously applicable to the manufacture of colored molded articles from the mentioned reactive solutions. But these phenomena have not been observed with any metal oxides. For instance, antimony trioxide has been shown to react not only with the catalyst component, but also with the activator componenet resulting in a gradual deactivation of Solution B when dispersed in Solution B. Fortunately, the recited pigments can be used to provide a variety of colors, for example, from black to white, and from red to violet by modifying the structures of the pigments, adding other small components or mixing of some of them as mentioned later in detail.

We have further found that the colored molded articles formed from the reactive solutions containing the pigments in Solution B have a clearer color than those formed from the reactive solutions containing the pigments in solution A, especially when light-colored pigments are used. The Solution A is usually dark-colored due to the catalyst component. Such dark-colored component may remain absorbed on the surface of the pigment particles even after the completion of the polymerization and affect the color of the pigmented articles, though most of the dark-colored component will be decolored during the polymerization.

Thus, we have found that carbon black from incomplete combustion, titanium oxides, iron oxides, and cobalt oxides, when dispersed in the reactive solution containing the activator component, can provide beautifully colored molded articles without affecting the reactivities of the solutions after storage.

Therefore, it is an object of the present invention to provide a process for producing colored molded articles of metathesis polymerized cross-linked polymers having a beautiful finish and anti-oxidant and light resistant properties.

A further object of the present invention is to provide a multi-part metathesis polymerizable composition useful for the production of the colored articles.

SUMMARY OF THE INVENTION

The present invention relates to a process for producing a molded article by introducing a multi-part polymerizable composition which comprises at least one metathesis polymerizable monomer and a metathesis polymerization catalyst system (comprising a catalyst component and an activator component) into a mold in which the composition is metathesis polymerized in bulk to produce a molded article. More specifically the catalyst component and the activator component of the metathesis polymerization catalyst system are present in different parts of the composition and at least one pigment selected from the following is present in the activator component: (a) carbon black prepared by an incomplete combustion process, (b) titanium oxides, (c) iron oxides and (d) cobalt oxides is present in the part in.

DETAILED DESCRIPTION OF THE INVENTION

The methods for preparing carbon black are classified under two processes: the thermal decomposition process and the incomplete combustion process.

The thermal decomposition process involves decomposing gaseous hydrocarbon such as natural gas and acetylene, thermally in the absence of air. The carbon blacks from natural gas are called thermal blacks and those from acetylene are called acetylene blacks. Both comprise rather pure carbon and are substantially free from oxygenated impurities, which are likely to react strongly with the components of metathesis catalyst systems. Carbon black is generally characterized by two characteristics: particle size (i.e., specific surface area determined by BET method) and structure (expressed as the DBP-absorbing amount (ml/100 g), of volatile components or the polarity of the surface function of the oxygenated components). In general, carbon black produced by thermal decomposition has a very narrow range of the above characteristics and is usually very expensive, as compared to carbon black from the incomplete combustion process. Carbon black from thermal decomposition is produced in limited amounts by a small number of manufacturers.

On the other hand, the carbon black from the incomplete combustion process, that is carbon black manufactured by combustion of gaseous hydrocarbon or hydrocarbons oil with insufficient air for complete combustion, has a very wide range of the above characteristics and can be produced at low cost. Incomplete combustion carbon blacks are also readily available commercially.

The incomplete combustion process includes the oil- or gas-furnace process, the channel process, the lamp black process and the like.

The lamp black process produces carbon blacks of rather poor quality and is not widely used. The channel process once dominated the market but is no longer used due to environmental pollution problem it causes.

In contrast, the oil furnace process can supply carbon blacks of a wide range of the above characteristics at high yields. It uses very inexpensive heavy-end oil and rather simple facilities. Therefore, carbon black from the oil furnace process now dominates the market.

Accordingly, the use of the oil-furnace carbon black as the pigments for coloring the mentioned metathesis polymer articles is desired. However, all carbon black from incomplete combustion contains some oxygenated impurities more or less, since it is prepared under an oxidative atmosphere.

Oxygenated impurities tend to react with the components of the metathesis caytalyst system. Such oxygenated impurities can be removed by heating contaminated black in the absence of air at elevated temperatures.

But such heat treatment makes the treated carbon black very expensive. Therefore, it is most desirable to find a method in which carbon black produced by incomplete combustion can by used as pigment for metathesis polymer articles without such heat treatment.

According to our detailed study, carbon black prepared by the incomplete combustion process reacts gradually with the catalyst component of the metathesis polymerization catalyst system when dispersed in Solution A and greatly reduces the activity of the catalyst component eventually. The further addition of the catalyst component into the monomer solution cannot restore the activity of the catalyst component. On the other hand, carbon black prepared by incomplete combustion reacts instantaneously with the activator component of the metathesis polymerization catalyst system when mixed in the Solution B, but the reaction soon stops and a supplemental charge of the activator equal to the amount consumed restores the activity of the solution and provides a stable monomer solution containing the activator component and dispersed carbon black.

Thus, the amount of the activator consumed when mixed with carbon black seems to correspond to the amount of the oxygenated components contained in the carbon black. The volatile components in the carbon black are a parameter of the amount of oxygenated components, and such oxygenated components appear to be located mainly on the surface of the carbon black particles.

Therefore, from the economical viewpoint, carbon black having a low volatile content and a small surface area are preferred. Usually, carbon black having a surface area up to 200 m$^2$/g, especially up to 120 m$^2$/g and a volatile content of up to 1.5%, especially up to 1.2% are preferably used in the present invention.

As for the titanium oxides (b), any of them may be used in the present invention. Titanium oxides may be composed of titanium and oxygen alone or may contain other elements such as barium, antimony, nicke, chromium or nitrogen etc. It is well-known that the titanium oxides include many forms such as monooxide (TiO), titanium(III)oxide (TI$_2$O$_3$), titanium dioxide (TiO$_2$), titanium peroxide (TiO$_3$) and their intermediates. As a pigment, titanium dioxide and titanium monooxide are used usually in pure-, titanate-, modified- or doped-forms. Among them, titan white (titanium dioxide), titan black (nitrogen-doped titanium oxide), titan yellow (TiO$_2$—NiO—Sb$_2$O$_3$) and titanium-oxide-based pigments pyrolitically prepared with other metal oxides such as barium-, nickel-, chromium- and antimony-oxides are preferably used. Of these, white titanium dioxide is preferred.

Among the many known white pigments, white titanium dioxide is more extensively used than other white pigments such as zinc oxide, lithopon (ZnS—BaSO$_4$), lead white and the like because of its high whiteness, superior chemical resistant properties such as anti-acidic- and anti-alkali-properties, and its non-toxicity.

Of the white titanium dioxide pigments, anatase type titanium dioxide and rutile type titanium dioxide in the crystal form are produced on an industrial scale. Rutile type titanium dioxide has a slightly higher density, refractive index, and weathering stability than anatase type titanium dioxide, but is slightly yellowish and poorer in whiteness than the anatase type titanium dioxide. In the present invention, both anatase type and rutile type titanium dioxides may be used depending on the circumstances. In general, rutile type titanium dioxide is prepared by the sulfuric acid-process, in which titanium sulfate prepared by the reaction between natural ilmenite and sulfuric acid is hydrolized with an alkali and then baked to produce titanium dioxide, and by the chlorine-process, in which titanium chloride prepared by the reaction between rutile or synthesized rutile or the like and chlorine is oxidized to prepare titanium dioxide. Anatase type titanium dioxide is generally prepared by the sulfuric acid-process. Of the two processes, the chlorine-process provides titanium dioxide having higher purity and quality than the sulfuric acid-process, though the chlorine-process is rather more expensive than the sulfuric acid-process. In the present invention, titanium dioxide prepared by either of the two porcesses may be used. In the present invention, titanium dioxide may be coated in advance with aluminum oxide, silicon oxide, silicon oxide-zinc oxide composite, zinc oxide, a silicone compound such as silicone oil and silan coupling agent, etc. to improve the suspension stability.

Titanium dioxide reacts gradually with the catalyst component of the metathesis polymerization catalyst system when mixed in Solution A and, ultimately greatly reduces the activity of the catalyst component although it is not known precisely why. The further addition of supplemental catalyst component into the monomer solution generally cannot restore the activity of Solution A. On the other hand, titanium dioxide reacts quickly with the activator component of the metathesis polymerization catalyst system when mixed in Solution B but the reaction soon stops and an additional charge of activator corresponding to the small amount consumed restores the activity of Solution B and results in a stable mixture of Solution B and dispersed titanium oxide.

The amount of activator consumed depends upon the grade of titanium dioxide, but and grade can be used to form a stable dispersion with Solution B by adjusting amount of the activator added.

Nitrogen-doped black titanium monooxide is a very fine black powder prepared by reducing titanium dioxide under nitrogen. It is sold under the name "titan black". Several grades of titan black are available on the market. They can be used similarly to titanium dioxide to produce black colored molded articles.

Any iron oxides which are used usually as pigments may be used in the present invention. Iron oxide pigments may contain other elements than iron, such as manganese, silicon, chromium, zinc, aluminum and the like. Examples of iron oxide pigments include black iron(III)+(II)oxide ($Fe_3O_4$), red iron(III)oxide ($Fe_2O_3$), umber (i.e., brown iron oxide $Fe_2O_3$ containing $MnO_2$ and/or $Mn_3O_4$ as a coloring component), ochre ($Fe_2O_3.SiO_2.Al_2O_2$), other synthetic pigments containing iron oxides as the main component and the like. Among them, black iron oxide ($Fe_3O_4$) and red iron oxide ($Fe_2O_3$) are preferred because they are widely used as coloring agents. In contrast with other black pigments like carbon black and titan black, the "black iron oxide ($Fe_3O_4$) usually has magnetic properties and results in molded articles with similar magnetic properties.

In the present invention, the pigments based upon cobalt oxides (d) can be used similarly to the above-mentioned titanium oxides and iron oxides. As pigment, pure cobalt oxide is rarely used alone. Rather it is modified pyrolytically with other oxides such as those of aluminum-, zinc-, chromium-, or nickel- and other oxides.

Among them, cobalt blue ($CoO.Al_2O_3$) is widely used to color plastics and is preferably used in the present invention.

Any of the pigments mentioned above may be used alone and some of the pigments may be used in combination. The single use of the white pigment such as white titanium dioxide, for example, provides a white-colored metathesis polymerized molded article, and the single use of the black pigment such as carbon black prepared by the incomplete combustion process, titan black and black iron oxide ($Fe_3O_4$) provides a black-colored molded article. The mixed use of two or more of the pigments provides a molded article having a mixed color. The color of the molded article can be varied by the selection, combination and/or amount of the pigments.

In the present invention, there is used 0.05–20 weight %, preferably 0.1–5 weight %, more preferably 0.2–3 weight %, based on the total weight of the multi-part metathesis polymerizable composition, of at least one pigment selected from the carbon black prepared by the imcomplete combustion process (a), titanium oxides (b), iron oxides (c) and cobalt oxides (d). The amount of the pigment to be added may be changed depending on the kind of the pigments, the suface conditions of the pigments, the desired color tone of the molded article, the use of the molded article, whether the molded article is further coated or not, and the like.

The pigments are added into the monomer solution containing the activator component of the metathesis polymerization catalyst system in any manner. The preferable manner of the addition of the pigments is a master batch method in which the pigment is mixed at first with a small amount of the monomer solution containing the activator component to prepare a master batch containing the dispersed pigments in a high concentration and then the master batch is diluted with the monomer solution containing the activator component to prepare a monomer solution containing the dispersed pigments in a prescribed amount. For the preparation of the master batch, there may be used any of apparatuses usually used in the processes to prepare the pigment-dispersed master batch, such as a ball mill, roller mill, Banbury mixer, ultrasonic dispersing apparatus and the like. The master batch may contain an elastomer which increases the viscosity of the master batch to disperse the pigments more stably and increases the impact strength of the molded article produced. When the sufficient dispersion of the pigments is attained, any other process than the master batch process may be used in the present invention. In the process other than the master batch process, there is preferably used a mixer which provides the monomer solution with a high mixing energy, such as homogenizer, high-shearing mixer or the like.

In the present invention, the metathesis polymerizable monomers are preferably cycloalkenes having 1–3 metathesis polymerizable cycloalkene moieties, especially at least one nobornene moiety. Examples of them include dicyclopentadiene (DCP), tricyclopentadiene, cyclopentadienemethylcyclopentadiene-codimer, 5-ethylidenenorbornene, 5-vinylnorbornene, 5-phenylnorbornene, norbornene, 5-cyclohexenylnorbornene, 1,4-methano-1,4,4a,5,6,7,8,8a-octahydronaphthalene, 1,4,5,8-dimethano-1,4,4a,5,6,7,8,8a-octahydronaphthalnene, 6-ethylidene-1,4,5,8-dimethano-1,4,4a,5,7,8,8a- heptahydronaphthalene, 1,4,5,8-dimethano-1,4,4a,5,8,8a-hexahydronaphthalene-ethylene-bis(5-norbornene, tri-cyclo-[8,2,1,0]trideca-5,11-diene, norbronadiene and the like.

They can be used alone or in the form of a mixture of some of them. Dicyclopentadiene or a mixture of dicyclopentadiene with at least one other monomer is preferable.

In the present invention, there may also be used other metathesis polymerizable cyclic compounds having at least one of hetero atoms such as oxygen, nitrogen and the like together with metathesis polymerizable cycloalkene moiety, preferably norbornene moiety.

The hetero atom forms a polar group in the structure of said cyclic compounds, and those cyclic compounds having the polar group often can moderate the metathesis polymerization reaction.

Preferred examples of the polar groups include ether groups, carboxylic ester groups, cyano groups, N-substituted imido groups and the like.

Examples of other cyclic compounds having the polar groups include [(5-norbornenyl)-methyl]phenyl ether, bis[(5-norbornenyl)-methyl]ether, 5-methoxycarbonylnorbornene, 5-methoxycarbonyl-5-methylnorbornene, 5[(2-ethylhexyloxy)-carbonyl]norbornene, ethylene-bis(5-norbornenecarboxylate), 5-cyanonorbornene, 6-cyano-1,4,5,8-dimethano-1,4,4a,5,6,7,8,8a-octahydronaphthalene, N-butylnadic acid imide, 5-(4-pyridyl)-norbornene and the like.

These cyclic compounds having polar groups are generally used with DCP and the like. It is also preferable that these other cyclic compounds have a lower level of impurities which inhibit the metathesis polymerization.

In general, as well known, the metathesis polymerization catalyst system is composed of two components, i.e., a main catalyst component and an activator component.

The metathesis polymerization reaction is an exothermal reaction and proceeds very rapidly. Under such situation, the polymerization often occurs before the mixture can be poured into a mold, and it makes the pouring of the mixture into the mold difficult and makes the production of large sized molded articles difficult.

Accordingly, in the present invention, the catalyst and the activator of the metathesis polymerization catalyst system are added to individual monomer solutions to form a multi-part reactive solution (i.e., a multi-part metathesis polymerizable composition, that is, Solution A and Solution By, and then the multi-part reactive solutions are mixed rapidly by means of impinging-mixing (the RIM process) or by using a static mixer or a dynamic rotary mixer, and finally the mixture is immediately poured into a mold wherein it is polymerized and molded.

In this method, the multi-part reactive solutions do not need to have the same composition of monomers in each part. The composition of the monomers of each solution may be changed freely taking final composition of the monomers into consideration.

As the catalyst component of the metathesis polymerization catalyst system are used salts such as halides of tungsten, molybdenum, rhenium or tantalium, perferably, tungsten and molybdenum. Particularly preferable are the tungsten compounds. Among tungsten compounds are preferred tungsten halides, tungsten oxyhalides and the like. More particularly, tungsten hexachloride and tungsten oxychloride are preferred. Organo ammonium tungstate may also be used. However, such tungsten halide compounds undesirably often initiate cationic polymerization immediately when added directly to the mixture of monomers. It is, therefore, preferable that they are previously suspended in an inert solvent such as, for example, benzene, toluene or chlorobenzene and solubilized by the addition of an alcoholic compound or a phenolic compound.

A chelating agent or a Lewis base is preferably added to the solution containing the tungsten compound in order to prevent indesirable polymerization such as cationic polymerization. Those additives may include acetylacetone, acetoacetic acid, alkyl esters, tetrahydrofuran, benzonitirile and the like. About 1-5 moles of a chelating agent or a Lewis base is preferably used per one mole of the tungsten compound. Under such situations, the reactive solution containing the monomers and the catalyst component of the metathesis polymerization catalyst system is kept stable sufficiently for practical use.

The activator components of the metathesis polymerization ctalyst system include organic metal compounds such as alkylated products of metals of Group I–Group III in the Periodic Table, preferably, tetraalkyl tins, trialkyl tin hydrides, alkylaluminum compound and alkylaluminum halide compounds including diethylaluminum chloride, ethylaluminum dichloride, trioctylaluminum, dioctylaluminum iodide, tetrabutyltin and the like. The activator component is dissolved in a mixture of monomers to form the other reactive solution.

According to the present invention, in principle, the molded articles are produced by mixing said two reactive solutions as already described above. The polymerization reaction, however, starts so rapidly when the above-mentioned composition is used, and so the indesirable initiation of polymerization often accompanied by partial gelling occurs before completion of filling of the mixed solution into the mold. In order to overcome the problem, it is preferable to use a polymerization moderating agent.

As such moderators are generally used Lewis bases, particularly, ethers, esters, nitriles and the like.

Examples of the moderators include ethylbenzoate, butyl ether, diglyme, diethyleneglycoldibutylether, benzonitrile and the like. Such moderators are generally added to the reactive solution containing the activator component.

In this case, when a polar monomer moderating the metathesis polymerization is used with DCP and the like in the reactive solution containing the activator component, the Lewis base may also be omitted.

When a tungsten compound is used as the catalyst component, the ratio of the tungsten compound to the above-mentioned monomers is about 1000:1—about 1500:1, and preferably about 2000:1 on molar base. When an alkylaluminum compound is used as th*e activator component, the ratio of the aluminum compound to the above-mentioned monomers is about 100:1—about 2000:1 and preferably around a ratio of about 200:1—about 500:1 on molar base.

When a part of the activator component is consumed during the initial reaction with the pigments added, a supplemental addition of the amount of the activator component consumed is desirable to carry out smoothly the metathesis polymerization molding process.

The amount of the masking agent or the moderator may be adjusted by experiments depending upon the amount of the catalyst system.

A variety of additives may be used practically in the present invention to improve or to maintain characteristics of the molded articles. The additives include fillers, reinforcing agents, antioxidants, light stabilizers, macromolecular modifiers, flame retardants and the like. These additive must be added to the starting solutions, since they cannot be added after the solutions are polymerized to the solid molded polymer.

They may be added to either one or both of multi-part reactive solutions. The additives must be ones being substantially unreactive with the highly reactive catalyst and activator component of the metathesis polymerization catalyst system in the solutions to avoid troubles as well as not to inhibit polymerization.

If a reaction between the additive and the catalyst system is unavoidable but does not proceed so rapidly, the additives can be mixed with the monomers to prepare a third solution, and the third solution is mixed with the first and/or second solutions of the multi-part solutions immediately before pouring the mixture into a mold. When the additive is a solid filler, a reactive solution containing the filler suspended in it can be used. Instead, the mold can be filled with the filler prior to pouring the reactive solutions into the mold.

The reinforcing agents and fillers can improve flexural modulus of the polymer. Then include glass fibers, mica, wollastonite and the like. The fillers whose surfaces are treated with silane coupling agent may preferably by used.

The molded articles of the invention may preferably contain an antioxidant. Preferably, a pheno- or amine-antioxidant is added previously to the polymerizable solution. Examples of the antioxidants include 2,6-t-butyl-p-cresol, N,N'-diphenyl-p-phenylenediamine, tetrakis[methylene-(3,5-di-t-butyl-4-hydroxycinnamate)methane, methylene-4,4'-bis(3,5-di-t-butyl-phenol) and the like.

The polymer molded articles of the invention may also contain other polymers, which are added to the monomer solution. Among polymers, elastomers are more preferable, since then increase the impact strength of the molded articles and they effectively control the viscosity of the solution. Examples of the elastomers include styrenebutadiene rubber, polybutadiene, styrene-butadiene-styrene triblock rubber, styrene-isoprene-styrene triblock rubber, polyisoprene, butyl rubber, ethylene-propylene rubber, ethylene-propylene-diene terpolymer, nitril rubber and the like.

In the present invention, further, there may be added a compound which reduces the amount of the unreacted residual monomers in the molded article to avoid the unpleasant odor originated from the unreacted monomers. Examples of such compound include $\alpha, \alpha, \alpha$-trichlorotoluene, ester of trichloro acetic acid, phthalic chloride, benzoic anhydride, phosphorus oxychloride, benzensulfonic chloride and the like.

As described above, the polymer molded articles of the invention are preferably prepared by simultaneous molding with polymerizing, i.e., by RIM process or pre-mix process including RTM and RI process. In RIM process, two parts of the monomer solutions of the metathesis polymerization composition in which the monomer solution containing the activator component further contains at least one of the pigments (a), (b) and (c) are rapidly mixed in the impingement mixing head of a RIM machine and the mixture is poured into a mold wherein it polymerizes and is molded.

In pre-mix process, two-part monomer solutions containing the catalyst component and the activator component respectively are previously mixed to prepare a pre-mixture and then the pre-mixture is introduced into a mold. In the RIM and RTM process, fillers such as glass fibers may be placed in the mold prior to pouring the mixed reactive solutions, or may be added in at least one of the reactive solutions or premixtures.

In both the RIM process and pre-mix process, the mixture can be introduced into the mold under relatively low pressure so that an inexpensive mold is usable. The temperature inside the mold increases rapaidly by heat of the polymerization reaction so that the polymerization reaction is completed in a short time. The molded article of the invention can be removed easily from the mold without a releasing agent, unlike the polyurethane-RIM process.

When the surface color desired for the molded article is the same as the color of the pigment mixed into the monomer solution containing the activator component, the surface coating of the molded article may be omitted.

To the contrary, when the surface color desired for the molded article is different from the color of the pigment mixed in the monomer solution containing the activator component, the molded article may be coated.

The surface of the molded articles has polarity probably by the oxidized layer formed on the surface so that conventional coatings such as epoxy, polyurethane and the like adhere to the surface well.

The molded article has many double bonds in it, and lacks in the light- and oxygen resistant properties.

In the present invention, for example, the white pigment such as titanium dioxide reflects the light, and, for example, the black pigments, such as carbon black prepared by the incomplete combustion process, titan black, black iron oxide, etc. absorb the light. The pigments will cover the double bonds in the molded article. Thus, the pigments provide the molded article with light resistant property as well as anti-oxidizing property in the present invention.

The present invention provides a variety of molded articles which include large sized molded articles such as parts of various vehicles including automobiles, motorbikes, motorboats, snowmobiles, etc. and housing of electric and electronic instruments and the like.

This invention described herein is illustrated by the following examples. These examples do not limit the invention.

EXAMPLES –10

Commerically available dicyclopentadiene (DCP) was purified by distillation under nitrogen and reduced pressure to produce purified DCP with a freezing point of 33.4° C. The purity was determined by gas chromatography to be not less than 99%.

Used was commercially available highly pure ethylidene norbornene (ENB) having purity above 99% determined by gas chromatography. [Preparation of a concentrated catalyst component solution]

19.80 g of tungsten hexachloride was added to 90 ml of anhydrous toluene under nitrogen and then a solution consisting of 0.925 g of t-butanol and 5 ml of toluene was added. After the mixture was stirred for one hour, a solution consisting of 11.05 g (0.05 mole) of nonylphenol and 5 ml of toluene was added and then stirred for one hour under nitrogen. 10 g of acetylacetone was added and then the solution was purged with nitrogen overnight to remove hydrogen chloride gas formed by the reaction of tungsten hexachloride with nonylphenol. Toluene was added to the resulting solution to prepare a concentrated-catalyst-component-solution containing 0.5M tungsten in terms of the metal content. [Preparation of a concentrated activator component solution]

31.17 g of tri-n-octylaluminum, 5.70 g of di-n-octylaluminum iodide and 13.42 g of diglyme were mixed under nitrogen, and then DCP was added to prepare a concentrated-activator-component-solution containing 1.0M aluminum in terms of the metal content. [Preparation of a solution containing mixed monomers]

DCP and ENB were mixed in the weight ratio of 96.25:3.75 to prepare a mixed-monomers-solution. [Preparation of solution containing the catalyst component in a standard concentration]

197 g of the mixed-monomers-solution was introduced into a glass bottle provided with a salem cap. After the sufficient purge of nitrogen, 2.96 ml of the concentrated catalyst component solution was introduced into the bottle using a syringe, and then the mixture was stirred enough to prepare a solution containing the catalyst component in a standar concentration (Solution A). [Preparation of a solution containing the activator component in a standard concentration]

1497 g of the mixed-monomers-solution was introduced into a glass bottle provided with a salem cap. After the sufficient purge of nitrogen, 4,44 ml of the concentrated activator component solution was introduced into the bottle by a syringe, and then the mixture was stirred enought to prepare a solution containing the activator component in a standard concentration (Solution B). [Preparation of Solution A containing carbon black]

197 g of the mixed-monomers-solution and 5 g of one of carbon blacks shown in Table 1 below, which are prepared by the incomplete combustion process, are introduced into a glass bottle, are stirred enough under purging nitrogen to disperse the carbon black homogeneously, and then 2.96 ml of the conentrated catalyst component solution was introduced into the bottle from a syringe to prepare a Solution A containing one of the carbon black]

197 g of the mixed-monomers-solution and 5 g of one of carbon blacks shown in Table 1 below, which are prepared by the incomplete combustion process, are introduced into a glass bottle, are stirred enough under purging nitrogen to disperse the carbon black homogeneously, and then 4.44 ml of the conentrated activator component solution was introduced into the bottle from a syringe to prepare a Solution B containing one of the carbon blacks (Carbon black-containing-Solution B). [Measuring of the metathesis polymerization activity]

There were introduced at 30° C. into a test tube provided with a salem cap having a termocouple, from two syringes, 2 ml of one of Solution A and Carbon black-containing-Solution B, the amount of Solution B or Carbon black-containing-Solution B being such amount to provide each of the volume ratios shown in Table 2 below, which ratios could provide a shortest "polymerization time". The mixture in the test tube was shaken vigorously. The mixture was metathesis polymerized exothermically. The time when the temperature of the mixture reached 100° C. after the introduction into the latter syringe was measured as "polymerization time". Results are shown in Table 2 below.

There was stored each of Solution A, Solution B, Carbon black-containing-Solution A and Carbon black-containing-Solution B for a time shown in Table 2 below.

Introduced at 30° C. into a test tube provided with a salem cap having a termocouple, from two syringes, were 2 ml of Solution A stored as above or Carbon black-containing-Solution A stored as above; and then Solution B stored as above or Carbon black-containing-Solution B stored as above; The amount of Solution B or Carbon black-containing-Solution B being such amount to provide each of the volume ratios shown in Table 2, below, that could provide the shortest "polymerization time". The "polymerization time" was measured. Results are shown in Table 2.

TABLE 1

Kind of Carbon blacks used

| Example No. | Kind of Carbon black Manufactured by | Trade Name | Specific surface area measured by BET method ($m^2/g$) | DBP-absorbing amount (ml/100 g) | Amount of volatile components (%) | pH |
|---|---|---|---|---|---|---|
| 1 | Tokai Carbon | Toka Black #4501 | 85 | 127 | 0.9 | 9.2 |
| 2 | " | #4500 | 58 | 168 | 0.6 | 6.0 |
| 3 | " | #5500 | 206 | 155 | 1.4 | 5.8 |
| 4 | Colombian Carbon | Raven 410 | 24 | 68 | 0.7 | 8.3 |
| 5 | Degusa | Printex L | 150 | 116 | 1.2 | 9.5 |
| 6 | " | Printex P | 100 | 120 | 0.9 | 10.0 |
| 7 | " | LB101 | 112 | 20 | 1.0 | 7.0 |
| 8 | Mitsubishi Kasei | #3150 | 130 | 110 | 1.0 | 7.0 |
| 9 | " | #10 | 28 | 83 | 0.6 | 7.0 |
| 10 | " | #5 | 25 | 69 | 0.4 | 8.0 |

(Note) LB101 is a lamp black and the others are oil furnace carbon blacks.

TABLE 2

| | | Combination of monomer solutions | | | | | | |
|---|---|---|---|---|---|---|---|---|
| | | (1) Solution A/Solution B | | (2) Solution A/Carbon black-containing-Solution B | | (3) Carbon black-containing-Solution A/Solution B | | (4) Carbon black-containing-Solution A/ Carbon black-containing-Solution B | |
| Example No. | Storage time (day) | Polymerization time (sec) | Volume ratio B/A | Polymerization time (sec) | Volume ratio B/A | Polymerization time (sec) | Volume ratio B/A | Polymerization time (sec) | Volume ratio B/A |
| 1 | 0 | 29 | 1.0 | 32 | 1.2 | 32 | 1.1 | 32 | 1.0 |
| | 7 | 34 | 0.8 | 37 | 1.0 | 54 | 1.1 | 50 | 1.2 |
| | 17 | 46 | 0.8 | 50 | 1.1 | 98 | 1.0 | 116 | 1.2 |
| 2 | 0 | 29 | 1.0 | 28 | 1.0 | 30 | 0.9 | 42 | 1.1 |
| | 7 | 33 | 0.8 | 36 | 1.0 | 43 | 0.9 | 47 | 1.1 |
| | 17 | 46 | 0.8 | 52 | 1.1 | 62 | 0.9 | 66 | 0.9 |
| 3 | 0 | 31 | 1.0 | 35 | 1.5 | 29 | 1.0 | 35 | 1.5 |
| | 4 | 35 | 0.9 | 40 | 1.5 | 46 | 1.0 | 51 | 1.5 |
| | 25 | 54 | 1.0 | 51 | 1.6 | 103 | 1.0 | 112 | 1.7 |
| 4 | 0 | 30 | 1.0 | 32 | 1.0 | 35 | 1.0 | 34 | 0.9 |
| | 7 | 34 | 0.9 | 38 | 1.0 | 44 | 1.0 | 49 | 1.1 |
| | 22 | 49 | 0.9 | 50 | 1.1 | 71 | 0.9 | 68 | 1.2 |
| 5 | 0 | 32 | 1.0 | 30 | 1.1 | 30 | 1.1 | 31 | 1.35 |
| | 6 | 38 | 0.9 | 43 | 1.1 | 65 | 1.2 | 49 | 1.3 |
| | 17 | 44 | 0.9 | 48 | 1.1 | 142 | 1.2 | 133 | 1.4 |
| 6 | 0 | 30 | 1.0 | 29 | 1.0 | 30 | 0.9 | 31 | 1.1 |
| | 6 | 35 | 0.9 | 28 | 1.0 | 40 | 1.0 | 44 | 1.0 |
| | 19 | 49 | 0.9 | 39 | 1.0 | 59 | 1.0 | 59 | 1.1 |
| 7 | 0 | 30 | 1.0 | 32 | 1.0 | 31 | 1.0 | 32 | 1.0 |
| | 6 | 35 | 0.9 | 44 | 1.1 | 48 | 1.0 | 48 | 1.0 |
| | 19 | 46 | 0.9 | 49 | 1.1 | 58 | 1.0 | 59 | 1.2 |
| 8 | 0 | 32 | 1.0 | 37 | 1.2 | 28 | 1.1 | 31 | 1.3 |
| | 4 | 49 | 1.0 | 52 | 1.2 | 62 | 1.1 | 76 | 1.4 |
| | 15 | 67 | 1.0 | 70 | 1.3 | 195 | 1.1 | 175 | 1.3 |
| 9 | 0 | 34 | 1.0 | 34 | 1.1 | 33 | 1.0 | 33 | 1.0 |
| | 5 | 42 | 0.9 | 40 | 1.2 | 51 | 1.0 | 51 | 1.3 |
| | 20 | 55 | 0.9 | 61 | 1.2 | 112 | 1.1 | 132 | 1.6 |
| 10 | 0 | 30 | 1.0 | 34 | 1.0 | 30 | 1.0 | 32 | 1.0 |
| | 10 | 38 | 0.9 | 40 | 1.3 | 59 | 1.1 | 65 | 1.3 |
| | 20 | 49 | 1.0 | 53 | 1.3 | 121 | 0.9 | 131 | 1.6 |

The results of Table 2 show that the "polymerization time" increases more when a carbon black prepared by the incomplete combustion process was added into Solution A containing the catalyst component than when no carbon black was added, while the addition of the carbon black into Solution B containing the activator component increase the "polymerization time" similarly to the case of the combination (1) of Table 2, in which no carbon black is added. In other words, the results of Table 2 show that the "polymerization time" increased as the storage time increased and that the lengthening of the "polymerization time" brought by storage increased more when carbon black prepared by the incomplete combustion process was added into Solution A containing the catalyst component than when the carbon black was added into Soluton B containing the activator component. These results mean the carbon blacks prepared by the incomplete combustion process react gradually with the catalyst component and reduce the activity of the catalyst component as the storage time increases. From this, it is understood that the carbon black prepared by the incomplete combustion process should not be added to the monomer solution containing the catalyst component but should be added into the monomer solution containing the activator component as in the present invention. The results further show that, even if carbon blacks reacted with activator component at first, the reaction stopped soon and the supplement of the amount of the activator component consumed by the reaction with carbon black provides a highly reactive metathesis polymerizable reactive monomer solution containing the activator component. In general, the "polymerization time" of about 60 sec. or less makes the RIM process possible, and thus the combination (2) of the present invention in Table 2 can be used effectively in the RIM process. The results of Table 2 also show that the amount of the Solution B (i.e., the amount of the activator component) to be suplemented varies depending on the kind of carbon black. Thus carbon black used in Example 3 needs a rather large amount of the supplement of Solution B (i.e., the activator component) because of its the high specific surface area, high content of the volatile components and low pH. The metathesis polymerized polymers produced from the combination of Solution A and Carbon black-containing-Solution B in the above Examples had a beautiful black color and were odorless. This means that the addition of 2.5 weight % of carbon black to the monomer solution containing the activator component can provide an odorless molded article having a beautiful black color and the surface coating of the molded article is unnecessary.

EXAMPLE 11–25

The same DCP and ENB as used in Examples 1–10 were used in these Examples 11–25.

Examples 11–25, also used the same concentrated catalyst component solution, concentrated activator component solution, mixed-monomers-solution, Solution A and Solution B as used in Examples 1-10. [Preparation of Solution A containing titanium dioxide]

197 g of the mixed-monomers-solution and 2 g of one of titanium dioxides shown in Table 3 below were introduced into a glass bottle, and then the mixture was stirred enough under purging nitrogen to disperse titanium dioxide homogeneously. 2.96 ml of the concentrated catalyst component solution was introduced into the bottle from a syringe to prepared a Solution A containing one of the titanium dioxides (Titanium dioxide-containing-Solution A). [Preparation of Solutin B containing titanium dioxide]

197 g of the mixed-monomers-solution and 2 g of one of titanium dioxides shown in Table 3 below were introduced into a glass bottle, and then the mixture was stirred enough under purging nitrogen to disperse the titanium dioxide homogeneously. 4.44 ml of the concentrated activator component solution was introduced into the bottle from a syring to prepare a Solution B containing one of the titanium dioxides (Titanium dioxide-containing-Solution B). [Measuring of the metathesis polymerization activity]

There were introduced at 30° C. into a test tube provided with a salem cap having a thermocouple, from two syringes, 2 ml of one of Solution A and Titanium dioxide-containing-Solution A and then one of Solution B and Titanium dioxide-containing-Solution B, the amount of Solution B or Titanium dioxide-containing-Solution B being such amount to provide each of the volume ratios shown in Table 4 below, which ratios could provide a shortest "polymerization time". The mixture in the test tube was shaken vigorously. The mixture was metathesis polymerized exothermically. The "polymerization time" was measured in the same manner as in Examples 1-10. Results are shown in Table 4 below.

Solution A, Solution B, Titanium dioxide-containing-Solution A and Titanium dioxide-containing-Solution B were each stored for the time shown in Table 4 below.

Introduced at 30° C. into a test tube provided with a salem cap having a thermocouple, from two syringes, were 2 ml of Solution A stored as above or Titanium dioxide-containing-Solution A stored as above; and then Solution B stored as above or Titanium dioxide-containing-Solution B stored as above. The amount of Solution B or Titanium dioxide-containing-Solution B being such amount to provide each of the volume ratios shown in Table 4, below, that could provide the shortest "polymerization time". The "polymerization time" was measured. Results are shown in Table 4.

TABLE 3

| | Kind of Tinanium dioxides used | | | | |
|---|---|---|---|---|---|
| | Kind of Tinanium dioxides | | Characteristics | | |
| Example No. | Manufactured by | Trade name | Type of crystal structure | Preparation process | Surface treating |
| 11 | Titan Kogyo | KA-30K | Anatase | Sulfuric acid process | — |
| 12 | " | KA-20 | " | Sulfuric acid process | Al |
| 13 | Fuji Titan | TA-200 | " | Sulfuric acid process | — |
| 14 | " | TA-400 | " | Sulfuric acid process | Al |
| 15 | " | TA-500 | " | Sulfuric acid process | Al, Si, Zn |
| 16 | Titan Kogyo | KR-460 | Rutile | Sulfuric acid process | Al |
| 17 | " | KR-270 | " | Sulfuric acid process | Al, Zn |
| 18 | " | KR-270D | " | Sulfuric acid process | Al, Zn |
| 19 | Fuji Titan | TR-700 | " | Sulfuric acid process | Al, Si |
| 20 | " | TR-840 | " | Sulfuric acid process | Al, Zn, Si |
| 21 | Ishihara Sangyo | CR-50 | " | Chlorine process | Al |
| 22 | " | CR-58 | " | " | Al |
| 23 | " | Cr-60-2 | " | " | Al, Organic compound |
| 24 | " | CR-63 | " | " | Al, Si |
| 25 | " | CR-80 | " | " | Al, Si |

TABLE 4

| | | Combination of monomer solutions | | | | | | | |
|---|---|---|---|---|---|---|---|---|---|
| | | (1) Solution A/Solution B | | (2) Solution A/Titanium dioxide-containing-Solution B | | (3) Titanium dioxide-containing Solution A/ Solution B | | (4) Titanium-dioxide containing-Solution A/Titanium dioxide-containing-Solution B | |
| Example No. | Storage time (day) | Polymerization time (sec) | Volume ratio B/A | Polymerization time (sec) | Volume ratio B/A | Polymerization time (sec) | Volume ratio B/A | Polymerization time (sec) | Volume ratio B/A |
| 11 | 0 | 30 | 1.0 | 34 | 0.9 | 30 | 1.0 | 30 | 1.0 |
| | 7 | 38 | 0.8 | 39 | 0.8 | 44 | 0.9 | 43 | 1.0 |
| | 21 | 52 | 0.8 | 52 | 0.8 | 69 | 0.8 | 71 | 0.8 |
| 12 | 0 | 30 | 1.0 | 35 | 0.95 | 30 | 1.0 | 35 | 1.0 |
| | 7 | 38 | 0.8 | 38 | 1.0 | 41 | 0.8 | 42 | 0.9 |
| | 21 | 52 | 0.8 | 56 | 0.95 | 66 | 0.8 | 68 | 0.9 |
| 13 | 0 | 28 | 1.0 | 33 | 1.0 | 29 | 0.9 | 31 | 1.0 |
| | 6 | 41 | 0.8 | 41 | 0.9 | 48 | 0.8 | 48 | 0.8 |
| | 15 | 49 | 0.8 | 51 | 0.9 | 59 | 0.8 | 59 | 0.8 |
| 14 | 0 | 28 | 1.0 | 37 | 1.0 | 30 | 1.0 | 33 | 1.1 |
| | 6 | 41 | 0.8 | 45 | 1.0 | 47 | 0.9 | 50 | 1.1 |
| | 15 | 49 | 0.8 | 52 | 1.0 | 63 | 0.8 | 66 | 1.0 |

TABLE 4-continued

| | | Combination of monomer solutions | | | | | | | |
|---|---|---|---|---|---|---|---|---|---|
| | | (1) Solution A/Solution B | | (2) Solution A/Titanium dioxide-containing-Solution B | | (3) Titanium dioxide-containing Solution A/ Solution B | | (4) Titanium-dioxide containing-Solution A/Titanium dioxide-containing-Solution B | |
| Example No. | Storage time (day) | Polymerization time (sec) | Volume ratio B/A | Polymerization time (sec) | Volume ratio B/A | Polymerization time (sec) | Volume ratio B/A | Polymerization time (sec) | Volume ratio B/A |
| 15 | 0 | 31 | 1.0 | 32 | 1.1 | 31 | 1.1 | 36 | 1.0 |
| | 6 | 42 | 0.9 | 44 | 1.0 | 53 | 0.9 | 54 | 1.0 |
| | 17 | 57 | 0.8 | 57 | 1.0 | 87 | 0.8 | 92 | 0.9 |
| 16 | 0 | 29 | 1.0 | 32 | 1.2 | 31 | 0.95 | 33 | 1.1 |
| | 7 | 37 | 0.9 | 42 | 1.0 | 51 | 0.9 | 52 | 1.0 |
| | 21 | 54 | 0.8 | 58 | 1.0 | 86 | 0.8 | 89 | 0.8 |
| 17 | 0 | 29 | 1.0 | 33 | 1.1 | 32 | 0.95 | 31 | 1.1 |
| | 7 | 37 | 0.9 | 45 | 1.2 | 48 | 1.1 | 52 | 1.1 |
| | 21 | 54 | 0.8 | 57 | 1.1 | 96 | 0.7 | 105 | 0.8 |
| 18 | 0 | 29 | 1.0 | 33 | 1.1 | 29 | 0.9 | 32 | 1.0 |
| | 7 | 37 | 0.9 | 44 | 1.1 | 49 | 0.8 | 50 | 1.0 |
| | 21 | 54 | 0.8 | 55 | 1.0 | 85 | 0.7 | 89 | 0.8 |
| 19 | 0 | 31 | 1.0 | 32 | 1.1 | 32 | 1.1 | 30 | 1.1 |
| | 6 | 42 | 0.9 | 44 | 1.1 | 50 | 0.9 | 52 | 1.0 |
| | 17 | 57 | 0.8 | 56 | 1.0 | 78 | 0.9 | 77 | 1.0 |
| 20 | 0 | 31 | 1.0 | 33 | 1.1 | 32 | 1.0 | 36 | 1.2 |
| | 6 | 42 | 0.9 | 44 | 1.1 | 61 | 1.0 | 59 | 1.1 |
| | 17 | 57 | 0.8 | 57 | 1.1 | 79 | 0.8 | 82 | 1.0 |
| 21 | 0 | 29 | 1.0 | 30 | 1.1 | 29 | 0.9 | 32 | 1.1 |
| | 4 | 42 | 1.0 | 45 | 1.2 | 51 | 1.0 | 46 | 1.1 |
| | 15 | 54 | 0.9 | 55 | 1.1 | 66 | 0.9 | 63 | 0.9 |
| 22 | 0 | 29 | 1.0 | 33 | 1.2 | 38 | 0.9 | 35 | 1.2 |
| | 4 | 42 | 1.0 | 45 | 1.2 | 49 | 0.9 | 51 | 1.1 |
| | 15 | 54 | 0.9 | 56 | 1.1 | 83 | 0.8 | 90 | 1.1 |
| 23 | 0 | 29 | 1.0 | 30 | 1.0 | 29 | 0.95 | 34 | 1.1 |
| | 6 | 38 | 1.0 | 40 | 0.9 | 42 | 0.9 | 45 | 1.1 |
| | 15 | 48 | 0.8 | 49 | 0.9 | 56 | 0.9 | 59 | 0.9 |
| 24 | 0 | 29 | 1.0 | 30 | 0.9 | 29 | 1.0 | 29 | 1.0 |
| | 6 | 38 | 1.0 | 40 | 1.0 | 42 | 0.8 | 42 | 0.8 |
| | 15 | 48 | 0.8 | 50 | 0.9 | 60 | 0.7 | 59 | 0.8 |
| 25 | 0 | 29 | 1.0 | 33 | 1.2 | 28 | 1.0 | 34 | 1.2 |
| | 6 | 38 | 1.0 | 44 | 1.2 | 49 | 0.8 | 56 | 1.2 |
| | 15 | 48 | 0.8 | 56 | 1.2 | 68 | 0.8 | 74 | 1.2 |

The results of Table 4 show the addition of titanium dioxide into Solution A containing the catalyst component provided a greater increase in "polymerization time" than the addition of titanium dioxide into Solution B containing the activator component.

The results of Table 4 also show that the "polymerization time" gradually lengthened as storage time increases in all cases but that the lengthening of the "polymerization time" brought about by the storage period increases more when titanium dioxide was added into Solution A containing the catalyst component than when it was added to Solution B. In addition, the increase in the "polymerization time" when the titanium dioxide was added to Solution B is substantially similar to that in case of the combination (1) shown in Table 4 with no titanium dioxide. These results means that titanium dioxides react gradually with the catalyst component and gradually reduce the activity of the catalyst component as the storage time increases. From these results, it is understood that titanium dioxide should not be added to the monomer solution containing the catalyst component but should be added to the monomer solution containing the activator component as in the present invention. The results further show that, even if titanium dioxides reacted with activator component at first, the reaction stopped soon and the supplement of the amount of the activator component consumed by the reaction with titanium dioxide resulted in a highly reactive metatheis polymerizable monomer solution containing the activator component.

The combination (2) of the present invention in Table 4 can be used effectively in the RIM process because it has a "polymerization time" of less than 60 sec. The results of Table 4 also show that the amount of the Solution B (i.e., the amount of the activator component) to be supplemented varies depending on the kind of titanium dioxides, depending on whether titanium dioxide is surface-treated or not and depending on the kind of surface treating agents. The metathesis polymerized polymers produced from the combination (2) comprising Solution A and Titanium dioxide-containing-Solution B in the above Examples 11–25 had a beautiful white color, although somewhat yellowish. In contrast, those from combination (3) showed a brownish appearance. This means that the addition of titanium dioxide into the monomer solution containing the activator component can provide the combination of the stable reactive solution and an molded article having a beautiful appearing white color so that the surface coating of the molded article is unnecessary, compared with the addition of titanium dioxide to Solution A.

EXAMPLES 26–27

The same DCP and ENB as used in Example 1–10 were used in these Examples 26–27.

Examples 26–27, also used the same concentrated catalyst component solution, concentrated activator component solution as mixed-monomers-solution, Solution A and Solution B as used in Examples 1–10. [Preparation of Solution A containing titan black]

197 g of the mixed-monomers-solution and 2 g of one of titan black shown in Table 5 below were introduced into a glass bottle, and then the mixture was stirred enough under purging nitrogen to disperse the titan black homogeneously. 2.96 ml of the concentrated catalyst component solution was introduced into the bottle from a syringe to prepare a Solution A containing one of the titan blacks (Titan black-containing-Solution A). [Preparation of Solution B containing titan black]

197 g of the mixed-monomers-solution and 2 g of one of titan black shown in Table 5 below were introduced into a glass bottle, and then the mixture was stirred enough under purging nitrogen to disperse the titan black homogenously. 4.44 ml of the concentrated activator component solution was introduced into the bottle from a syringe to prepare a Solution B containing one of the titan black (Titan black-containing-Solution B). [Measuring of the metathesis polymerization activity]

Introduced at 30° C. into a test tube provided with a salem cap having a thermocouple, from two syringes, were 2 ml of Solution A or Titan black-containing-Solution A; and then Solution B or Titan black-containing-Solution B. The amount of Solution B or Titan black-containing-Solution B being such amount to provide each of the volume ratios shown in Table 5 below, that could provide the shortest "polymerization time". The mixture in the test tube was shaken vigorously. The mixture was metathesis polymerized exothermically. The "polymerization time" was measured in the same manner as in Examples 1–10. Results are shown in Table 5 below.

Solution A, Solution B, Titan black-containing-Solution A and Titan black-containing-Solution B were stored for 4 days or 35 days as shown in Table 5 below.

Introduced at 30° C. into a test tube provided with a salem cap having a thermocouple, from two syringes, were 2 ml of Solution A stored as above or Titan black-containing-Solution A stored as above; and then Solution B stored as above or Titan black-containing-Solution B stored as above. The amount of Solution B or Titan black-containing-Solution B being such as to provide each of the volume ratios shown in Table 5, that could provide the shortest "polmerization time". The "polymerization time" was measured. Results are shown in Table 5.

ymerization time" similarly to the combination (1) in Table 5 with no titan black.

In other words, the results of Table 5 show that the "polymerization time" increased more as the storage time increased but that the lengthening of the "polymerization time" brought about by the storage was larger when titan black was added to Solution A containing the catalyst component than when added into Solution B containing the activator component. These results mean that titan black reacts gradually with the catalyst component and gradually reduces the activity of the catalyst component as the storage time increases. From these results, it is understood that titan black should not be added into the monomer solution containing the catalyst component but should be added to the monomer solution containing the activator component as in the present invention.

The combination (2) of the present invention in Table 5 can be used effectively in the RIM process because its "polymerization time" is less than 70 sec. The metathesis polymerized polymers produced from the combination (2) comprising Solution A and Titan black-containing-Solution B in the above Examples 26 and 27 had a beautiful black color. This means that the addition of titan black to the monomer solution containing the activator component can provide very stable reactive solutions and molded articles having a beautiful black color from them so that the surface coating of the molded article is avoidable.

EXAMPLES 28–30

The same DCP and ENB as used in Examples 1–10 were used in these Examples 28–30.

Examples 28–30, also used the same concentrated catalyst component solution, concentrated activator component solution, mixed-monomers-solution, Solution A and Solution B as used in Examples 1–10. [Preparation of Solution A containing the iron oxide]

197 g of the mixed-monomers-solution and 2 g of any one of iron oxides shown in Table 6 sold by DAINIPPON INK CO. or Dainichi Seika Co. were introduced into a glass bottle and then the mixture was stirred enough under purging nitrogen to disperse the iron oxide homogeneously. 2.96 ml of the concentrated catalyst component solution was introduced into the bottle from a syringe to prepare a Solution A containing one of the iron oxides (Iron oxide-containing-Solution A). [Preparation of Solution B containing the iron oxide]

197 g of the mixed monomers-solution and 2 g of the same iron oxide as above were introduced into a glass bottle and then the mixture was stirred enough under purging nitrogen to disperse the iron oxide homoge-

TABLE 5

| | | | Combination of monomer solutions | | | | | | |
|---|---|---|---|---|---|---|---|---|---|
| | | | (1) Solution A/Solution B | | (2) Solution A/Titan black-containing-Solution B | | (3) Titan black-containing-Solution A/Solution B | | (4) Titan black-containing-Solution A/Titan black-containing-Solution B | |
| Example No. | Kind of Titan black used | Storage time (day) | Polymerization time (sec) | Volume ratio B/A | Polymerization time (sec) | Volume ratio B/A | Polymerization time (sec) | Volume ratio B/A | Polymerization time (sec) | Volume ratio B/A |
| 26 | Titan black 13R (Mitsubishi Kinzoku) | 0 | 28 | 1.0 | 31 | 0.9 | 31 | 0.9 | 33 | 1.0 |
| | | 4 | 32 | 0.9 | 35 | 1.0 | 49 | 0.8 | 51 | 0.9 |
| | | 35 | 70 | 0.9 | 62 | 0.9 | 167 | 0.8 | 188 | 0.8 |
| 27 | Titan black 10S (Mitsubishi Kinzoku) | 0 | 28 | 1.0 | 31 | 1.0 | 35 | 0.9 | 35 | 1.0 |
| | | 4 | 32 | 0.9 | 35 | 1.0 | 55 | 0.8 | 56 | 0.8 |
| | | 35 | 70 | 0.9 | 68 | 0.9 | 146 | 0.8 | 177 | 0.8 |

The results of Table 5 show that the addition of titan black into Solution A containing the catalyst component provides more increased "polymerization time" than in the case of combination (1) (no titan black added), while the addition of titan black into Solution B containing the activator component increased the "polneously. 4.44 ml of the concentrated activator component solution was introduced into the bottle from a syringe to prepare a Solution B containing one of the iron oxides (Iron oxide-containing-Solution B). [Measuring of metathesis polymerization activity]

Introduced at 30° C. into a test tube provided with a salem cap having a thermocouple, from two syringes, were 2 ml of Solution A or Iron oxide-containing-Solution A; and then Solution B or Iron oxide-containing-Solution B, the amount of Solution B or Iron oxide-containing-Solution B being such amount as to provide each of the volume ratios shown in Table 6, below, that could provide the shortest "polymerization time". The mixture in the test tube was shaken vigorously. The mixture was metathesis polymerized exothermically. The "polymerization time" was measured in the same manner as in Example 1-10. Results are shown in Table 6 below.

Solution A, Solution B, Iron oxide-containing-Solution A and Iron oxide-containing-Solution B for the periods as shown in Table 6 below.

Introduced at 30° C. into a test tube provided with a salem cap having a thermocouple, from two syringes, were 2 ml of Solution A stored as above or Iron oxide-containing-Solution A stored as above; and then Solution B stored as above or Iron oxide-containing-Solution B stored as above, the amount of Solution B or Iron oxide-containing-Solution B being such amount as to provide each of the volume ratios shown in Table 6, below, that could provide the shortest "polymerization time". The "polymerization time" was measured. Results are shown in Table 6.

ponent and gradually reduces the activity of the catalyst component as the storage time increases. From these results, it is understood that the iron oxide should not be added to the monomer solution containing the catalyst component but should be added into the monomer solution containing the activator component as in the present invention. The results further show that, even if the iron oxide reacted with activator component at first, the reaction stopped soon and the supplement of the amount of the activator component consumed by the reaction with the iron oxide provides a highly reactive metathesis polymerizable monomer solution containing the activator component.

The combination (2) of the present invention in Table 6 can be used effectively in the RIM process because it has a "polymerization time" of 60 sec. or less during at least a one-month storage. The metathesis polymerized polymers produced from the combination (2) comprising Solution A and each iron oxide-containing-Solution B in the above Example 30 had a beautiful color. Especially in case of Examples 29 and 30 the colors of the molded articles from combination (2) are clearer in appearance than those from combination (3). This means that the addition of the iron oxide into the monomer solution containing the activator component can provide an molded articles having a beautiful color so that the surface coating of the molded article is unnecessary.

EXAMPLES 31-32

The same DCP and ENB as used in Examples 1-10 were used in these Examples 31-32.

TABLE 6

| | | | | Combination of monomer solutions | | | | | |
|---|---|---|---|---|---|---|---|---|---|
| | | | (1) Solution A/ Solution B | | (2) Solution A/Iron oxide-containing-Solution B | | (3) Iron oxide containing-Solution A/ Solution B | | (4) Iron oxide containing-Solution A/Iron oxide containing-Solution B | |
| Ex. No. | Kind of iron oxides | Trade name (Manufacturer) | Storage time (day) | Polymerization time (sec) | Volume ratio B/A | Polymerization time (sec) | Volume ratio B/A | Polymerization time (sec) | Volume ratio B/A | Polymerization time (sec) | Volume ratio B/A |
| 28 | Black iron oxide | Black iron oxide A (DAINIPPON INK) | 0 | 28 | 1.0 | 30 | 1.0 | 30 | 0.9 | 30 | 0.9 |
| | | | 4 | 32 | 0.9 | 35 | 0.95 | 49 | 0.8 | 55 | 0.8 |
| | | | 38 | 70 | 0.9 | 70 | 0.95 | 162 | 0.7 | 161 | 0.7 |
| 29 | Red iron oxide ($Fe_2O_3$) | Red #B (Dainichi Seika) | 0 | 29 | 1.0 | 29 | 1.1 | 30 | 1.0 | 30 | 1.0 |
| | | | 7 | 33 | 0.9 | 35 | 1.0 | 49 | 0.75 | 51 | 0.85 |
| | | | 23 | 46 | 0.9 | 45 | 0.9 | 87 | 0.55 | 89 | 0.65 |
| 30 | Ochre ($Fe_2O_3 \cdot SiO_2Al_2O_3$) | Yellow #A (Dainichi Sieka) | 0 | 29 | 1.0 | 29 | 1.0 | 28 | 1.0 | 28 | 1.0 |
| | | | 7 | 36 | 0.9 | 36 | 0.9 | 48 | 0.75 | 49 | 0.75 |
| | | | 22 | 44 | 0.9 | 44 | 0.9 | 79 | 0.65 | 81 | 0.75 |

The results of Table 6 show that, during storage, the addition of the iron oxide to Solution A containing the catalyst component increased the "polymerization time" more rapidly than in the case of combination (1) containing no pigment, while addition of the iron oxide to Solution B containing the activator component increased the "polymerization time" similarly to the combination (1) with no iron oxide.

In other words, the results of Table 6 show that the "polymerization time" increased as the storage time increased but that the lengthening of the "polymerization time" brought about storage was greater when the iron oxide was added to Solution A containing the catalyst component than when it was added to Solution B containing the activator component. These results mean that iron oxide reacts gradually with the catalyst com- Examples 31-32, also used the same concentrated catalyst component solution, concentrated activator component solution, mixed-monomers-solution, Solution A and Solution B as used in Examples 1-10. [Preparation of Solution A containing cobalt oxide derivatives]

197 g of the mixed-monomers-solution and 2 g of any one of the cobalt oxide derivatives shown in Table 7 sold by Dainichi Seika Co. were introduced into a glass bottle and the mixture was stirred enough under purging nitrogen to disperse the cobalt oxide derivatives homogeneously. 2.96 ml of the concentrated catalyst component solution was introduced into the bottle from a syringe to prepare a Solution A containing one of the cobalt oxide derivatives (Cobalt oxide-containing-Solution A). [Preparation of Solution B containing cobalt oxide derivatives]

197 g of the mixed monomers-solution and 2 g of the same cobalt oxide derivatives as above were introduced into a glass bottle and then the mixture was stirred enough under purging nitrogen to disperse the cobalt oxide derivatives homogeneously. 4.44 ml of the concentrated activator component solution was introduced into the bottle from a syringe to prepare a Solution B containing one of the cobalt oxide derivatives (Cobalt oxide-containing-Solution B). [Measuring of metathesis polymerization activity]

Introduced at 30° C. into a test tube provided with a salem cap having a thermocouple, from two syringes, were 2 ml of Solution A or Cobalt oxide-containing-Solution A; and then Solution B or Cobalt oxide-containing-Solution B; the amount of Solution B or Cobalt oxide-containing-Solution B being such as to provide each of the volume ratios shown in Table 7 below, which ratios could provide a shortest "polymerization time". The mixture in the test tube was shaken vigorously. The mixture was metathesis polymerized exothermically. The "polymerization time" was measured in the same manner as in Example 1–10. Results are shown in Table 7 below.

Solution A, Solution B, Cobalt oxide-containing-Solution A and Cobalt oxide-containing-Solution B were stored for the periods shown in Table 7 below.

Introduced at 30° C. into a test tube provided a salem cap having a thermocouple, from two syringes, were 2 ml of Solution A stored as above or Cobalt oxide-containing-Solution A stored as above; and then Solution B stored as above, or Cobalt oxide-containing-Solution B stored as above. The amount of Solution B or Cobalt oxide-containing-Solution B being such amount to provide each of the volume ratios shown in Table 7 below, that could provide the shortest "polymerization time". The "polymerization time" was measured. Results are shown in Table 7.

In other words, the results of Table 7 show that "polymerization time" increased more as the storage time increased but that the lengthening of the "polymerization time" brought about by the storage was greater when the cobalt oxide derivative was added to Solution A containing the catalyst component than when it was added to Solution B containing the activator component. These results mean that cobalt oxide derivatives react gradually with the catalyst component and gradually reduce the activity of the catalyst component as the storage time increases. From these results, it is understood that the cobalt oxide derivatives should not be added to the monomer solution containing the catalyst component but should be added to the monomer solution containing the activator component as in the present invention. The results further show that, even if the cobalt oxide derivatives reacted with activator component at first, the reaction stopped soon and the supplement of the amount of the activator component consumed by the reaction with the cobalt oxide derivatives provide a highly reactive metathesis polymerizable monomer solution containing the activator component.

The combination (2) of the present invention in Table 7 can be used effectively in the RIM process because it has a "polymerization time" of 50 sec. or less after about a one-month storage. The metathesis polymerized polymers produced from the combination (2) comprising Solution A and each Cobalt oxide-containing-Solution B in the above Examples 31–32 had a beautiful color. Especially in case of Examples 31–32, the colors of the molded articles from combination (2) are clearer in appearance than those from combination (3). This means that the addition of the cobalt-oxide-pigment into the monomer solution containing the activator component can provide a molded article having a beautiful color so that surface coating of the molded article is unnecessary.

What we claim is:

1. A process for producing a molded article comprising the steps of:
preparing a first reactive solution containing at least one metathesis polymerizable cycloolefin and a catalyst component of a metathesis polymerization catalyst system comprising a halide of tungsten, molybdenum, rhenium or tantalum;
preparing a second reactive solution containing at least one metathesis polymerizable cycloolefin ana an activator component for said metathesis poly-

TABLE 7

| | | | | Combination of monomer solutions | | | | | | | |
|---|---|---|---|---|---|---|---|---|---|---|---|
| | | | (1) Solution A/Solution B | | (2) Solution A/Cobalt oxide-containing-Solution B | | (3) Cobalt oxide-containing-Solution A/ Solution B | | (4) Cobalt oxide-containing-Solution A/ Cobalt oxide-containing-Solution B | |
| Ex. No. | Kind of cobalt oxide derivatives | Trade name (Manufacturer) | Storage time (day) | Polymerization time (sec) | Volume ratio B/A | Polymerization time (sec) | Volume ratio B/A | Polymerization time (sec) | Volume ratio B/A | Polymerization time (sec) | Volume ratio B/A |
| 31 | Cobalt blue ($CoO \cdot nAl_2O_3$) | Daipyroxide blue #9410 (Dainichi Seika) | 0 | 28 | 1.0 | 29 | 1.1 | 28 | 1.0 | 28 | 1.1 |
| | | | 6 | 34 | 0.9 | 36 | 1.1 | 41 | 0.9 | 42 | 1.0 |
| | | | 25 | 43 | 0.9 | 45 | 0.95 | 65 | 0.85 | 68 | 1.0 |
| 32 | Green pigment (Co, Ni, Ti, Zn-oxides pyrolitically formed) | Daipyroxide green #9310 (Dainichi Seika) | 0 | 28 | 1.0 | 28 | 1.0 | 28 | 1.0 | 28 | 1.0 |
| | | | 6 | 34 | 0.9 | 34 | 0.9 | 37 | 0.9 | 37 | 0.9 |
| | | | 25 | 34 | 0.9 | 44 | 0.9 | 49 | 0.85 | 51 | 0.9 |

The results of Table 7 show that, during storage, the addition of the cobalt oxide derivatives to Solution A containing the catalyst component increased the "polymerization time" more rapidly than in the case of combination (1) containing no pigment, while the addition of the cobalt oxide derivatives into Solution B containing the activator component increased the "polymerization time" similarly to combination (1) with no cobalt oxide derivatives.

merization catalyst system, wherein said activator component is selected from the group consisting of tetraalkyl tins, trialkyl tin hydrides, alkylaluminum compounds and alkylaluminum halide compounds;

adding at least one pigment selected from the group consisting of (a) a carbon black prepared by the incomplete combustion process, (b) a titanium oxide, (c) an iron oxide, and (d) a cobalt oxide to said second reactive solution;

adding, subsequent to the addition of said pigment, a supplementary amount of said activator component to said second reactive solution to compensate for said activator component consumed when said pigment is added to said second reactive solution;

combining a plurality of reactive solutions comprising at least said first reactive solution and said second reactive solution; and introducing said combined reactive solutions into a mold and metathesis polymerizing in bulk in said mold to produce said molded article.

2. A process according to claim 1, where said at least one pigment is incorporated into said second reactive solution containing the activator component in the amount of 0.05-20 weight % based on the total weight of said combined reactive solutions.

3. A process according to claim 1, where said carbon black prepared by the incomplete combustion process is an oil furnace carbon black or lamp black.

4. A process according to claim 1, where said titanium oxide is white titanium oxide, black nitrogen-doped titanium monooxide, or titanium yellow $TiO_2$—$NiOSb_2O_3$.

5. A process according to claim 1, where said iron oxide is black iron oxide $Fe_3O_4$, red iron oxide $Fe_2O_3$, or ochre.

6. A process according to claim 1, where said cobalt oxide is cobalt blue.

7. A process according to claim 1, where said at least one metathesis polymerizable cycloolefin is predominantly dicyclopentadiene.

8. A process according to claim 1, where said at least one metathesis polymerizable cycloolefin is a mixture of dicyclopentadiene and other metathesis polymerizable monomers.

* * * * *